United States Patent [19]
Wiechert et al.

[11] 3,789,087
[45] Jan. 29, 1974

[54] 4,6-DICHLOR-$\Delta^{4,6}$-STEROIDS AND METHOD OF MAKING AND USING THE SAME

[75] Inventors: Rudolf Wiechert; Friedmund Neumann, both of Berlin, Germany

[73] Assignee: Schering AG, Berlin, Germany

[22] Filed: June 5, 1968

[21] Appl. No.: 734,513

[30] Foreign Application Priority Data
June 9, 1967  Germany ........................ 1643027

[52] U.S. Cl... 260/397.3, 260/239.55 D, 260/397.4, 260/397.45, 260/397.47, 424/242, 424/243
[51] Int. Cl. .......................................... C07c 169/34
[58] Field of Search ................................ 260/397.4

[56] References Cited
UNITED STATES PATENTS

| | | | |
|---|---|---|---|
| 3,707,537 | 12/1972 | Kierstead .................. | 260/239.55 C |
| 3,439,093 | 4/1969 | Hader et al. ................ | 260/397.4 |
| 3,452,058 | 6/1969 | Ringold et al. .............. | 260/397.4 |
| 3,480,711 | 11/1969 | Weichert .................... | 260/397.45 |

FOREIGN PATENTS OR APPLICATIONS

| | | | |
|---|---|---|---|
| 838,773 | 6/1960 | Great Britain ............... | 260/239.55 |

Primary Examiner—Henry A. French
Attorney, Agent, or Firm—Michael S. Striker

[57] ABSTRACT

4,6-dichlor-$\Delta^{4,6}$-steroids of the pregnane and androstane series are produced by reacting a 4-chlor- or a 6-chlor-$\Delta^{4,6}$-steroid which includes a group of the formula:

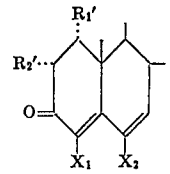

wherein $X_1$ and $X_2$ are different and respectively denote hydrogen or chlorine, and wherein each of $R_1'$ and $R_2'$, respectively, is hydrogen, or $R_1'$ and $R_2'$ jointly denote a methylene group, with compounds capable of forming, respectively, positive and negative chlorine ions; and treating the thus-obtained reaction product with a base.

The thus-obtained novel compounds, in the form of pharmaceutical compositions for oral or intramuscular administration are useful in the treatment of gynecological disorders and as contraceptive.

1 Claim, No Drawings

4,6-DICHLOR-$\Delta^{4,6}$-STEROIDS AND METHOD OF MAKING AND USING THE SAME

BACKGROUND OF THE INVENTION 6-chlor-$\Delta^{4,6}$-steroids are of great importance in view of their therapeutically valuable characteristics. For instance, 6-chlor-$\Delta^{4,6}$-pregnadiene-17α-ol-3,20-dion-acetate and 6-chlor-1,2α-methylene-$\Delta^{4,6}$-pregnadiene-17α-ol-3,20-dion-acetate are strong gestagenic agents.

It is an object of the present invention to provide compounds in which the valuable properties of the 6-chlor-$\Delta^{4,6}$-steroids, such as the compounds described above, are further enhanced.

SUMMARY OF THE INVENTION

Surprisingly, it has been found that the valuable properties of the above-described compounds or group of compounds are further improved by introduction of an additional chlorine atom into the 4-position thereof.

The present invention therefore proposes 4,6-dichlor-$\Delta^{4,6}$-steroids of the pregnane and androstane series.

Preferably, the compounds of the present invention are of the formula:

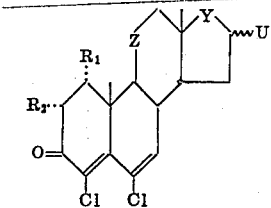

wherein each of $R_1$ and $R_2$, respectively, is hydrogen, or $R_1$ and $R_2$ jointly denote a methylene group or a second carbon-carbon bond between carbon atoms C-1 and C-2; U denotes hydrogen, a lower alkyl with between one and four carbon atoms, or a methylene group attached to carbon atom C-17; wherein Y denotes

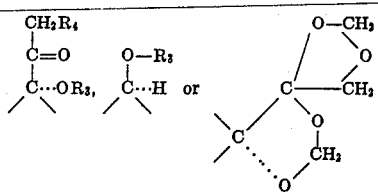

wherein $R_3$ is hydrogen or acyl and $R_4$ is hydrogen, fluorine or O-acyl; and wherein Z is

or C=O.

The above-described compounds are produced, in accordance with the present invention, by reacting a 4-chlor- or a 6-chlor-$\Delta^{4,6}$-steroid which includes a group of the formula

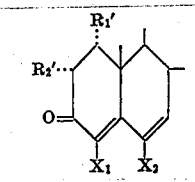

wherein $X_1$ and $X_2$ are different and respectively denote hydrogen or chlorine; and wherein each of $R_1'$ and $R_2'$, respectively, is hydrogen, or $R_1'$ and $R_2'$ jointly denote a methylene group, with compounds capable of forming, respectively, positive and negative chlorine ions; and treating the thus-obtained reaction product with a base.

It is also within the scope of the present invention to introduce into the thus-obtained product a double bond in the 1,2-position.

The compound capable of forming positive chlorine ions preferably is N-chlorsuccinimide or N-chloroacetamide, and the compound capable of forming negative chlorine ions preferably may be lithium chloride.

The base may be an organic or an inorganic base but preferably will be an organic base. Very good results are obtained by utilizing as the base pyridine, quinoline, lutidine, aniline, diazabicyclonones or dimethylformamide.

The present invention is also concerned with pharmaceutical compositions for the treatment of gynecological disorders and with compositions having a contraceptive effect, which compositions consist essentially of effective amounts of the above-described novel compounds and a suitable pharmaceutical diluent.

Furthermore, the present invention is also concerned with a method of preventing conception and with a method of treating patients suffering from certain gynecological disorders, as will be described in more detail below, which method comprises administering, preferably orally or intramuscularly, an effective amount of one of the above-described compounds.

DESCRIPTION OF THE PREFERRED EMBODIMENTS

The present invention proposes a method of producing novel 4,6-dichlor-$\Delta^{4,6}$-steroids of the pregnane and androstane series which include the group

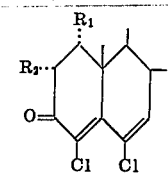

wherein $R_1$ and $R_2$, each taken alone may be hydrogen, or $R_1$ and $R_2$ taken together may be methylene group or a second carbon-carbon bond between the carbon atoms C-1 and C-2.

According to the present invention, a corresponding 4-chlor- or 6-chlor-$\Delta^{4,6}$-steroid including the group

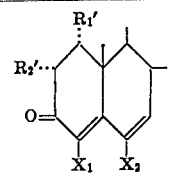

wherein $X_1$ and $X_2$ are different, one being hydrogen and the other chlorine, and $R_1'$ and $R_2'$, each taken alone may be hydrogen, or $R_1'$ and $R_2'$ taken together may be a methylene group, are reacted with compounds capable of forming, and actually forming in the reaction mixture, positive and negative chlorine, followed by treating the thus-obtained reaction product with a base and, if desired, thereafter introducing a double bond in the 1,2-position.

The positive and negative chlorine are freed during the reaction from suitable chlorine-containing compounds. For instance, positive chlorine is formed of N-chlor-acylamides, or acylimides, preferably from N-chlor-acetamide and N-chlor-succinimide. However, it is also possible to obtain the positive chlorine ions from hypochlorides such as tertiary butylhypochloride.

The preferred compound for producing negative chlorine ions is lithium chloride. Furthermore, it is of course also possible to split elementary chlorine into positive and negative chlorine ions. The last-mentioned reaction is described for instance in the German textbook of inorganic chemistry by H. Remy, Vol. 1, page 930 (1965).

The present method may be carried out by dissolving the starting steroid compound in a solvent which is inert with respect to the reactants, cush as formic acid, acetic acid, propionic acid, ethanol, methanol, acetone or the like and to react the thus-dissolved steroid with N-chlorsuccinimide in the presence of a strong water-free acid, such as hydrogen chloride in dioxan or tetrahydrofuran, at low temperatures.

Thereby, the $\Delta^6$-double bond will be chlorinated and a 4,6,7- or 6,6,7-trichloro compound formed which for complete splitting off of hydrogen chloride and binding is treated with a, preferably organic, base. Excellently suitable for use as the organic base are pyridine, quinoline, lutidine, aniline, diazabicyclonones and dimethylformamide. However, it is also possible to use inorganic bases for binding the hydrogen chloride, such as alcoholic solutions of sodium hydroxide or potassium hydroxide.

If from the 6-chlor compound a 6,6,7-trichlor compound has been formed, it is possible to split off hydrogen chloride at low temperatures up to ambient temperature. To operate in this manner is preferred due to the smooth reaction and higher yield of the finally desired 4,6-dichlor compound.

However, in case of 4,6,7-trichlor compounds produced by conversion of the 4-chlor compound, the after-treatment with a base preferably is carried out under reflux.

The partial chlorinating of the $\Delta^6$-double bond and the subsequent splitting off of hydrogen chloride with migration of one chlorine atom has not been previously investigated with respect to the 6-chlorinated compounds. The manner in which the reaction proceeds was not predictable and is surprising. For instance, applicants have found that it is not possible to carry out analogous reactions with N-bromsuccinimide.

The steroids which serve as starting materials for the method of the present invention may contain any desired other groups, provided that such other groups are inert with respect to the reactants. Such inert groups include, for instance, oxo groups, free and functionally modified hydroxy groups, alkyl groups, alkylene groups, and halogen atoms, provided that the latter cannot be converted by splitting off of hydrogen halide into a conjugated double bond system. On the other hand, isolated double bonds interfere with the reaction since they are also attacked by chlorine.

Preferred starting materials for the process of the present invention, are compounds of the formula:

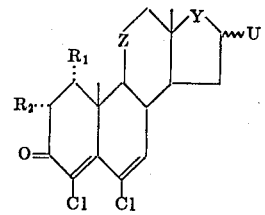

wherein $R_1'$, $R_2'$, $X_1$ and $X_2$ have the same meaning as described further above, and Y is one of the following groups

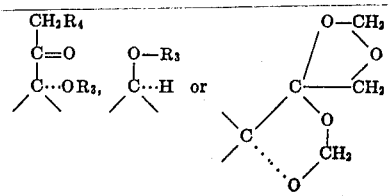

in which groups $R_3$ denotes hydrogen or acyl, and $R_4$ denotes hydrogen, fluorine or O-acyl.

U designates hydrogen, a lower alkyl with between 1 and 4 carbon atoms or a $CH_2$ group attached to $C_{17}$; and Z denotes

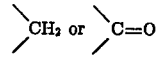

As pointed out above, if desired, after the base treatment for splitting off hydrogen chloride, a $\Delta^1$-double bond may be introduced in a manner known per se. For instance, by dehydrogenation with selenous acid or dichlordichloro-dicyan-benzoquinone.

The thus-obtained novel 4,6-dichlor-$\Delta^{4,6}$-steroids are valuable hormonal agents. Particularly noteworthy is the strong gestagenic effect of the new dichlor compounds in the pregnane series which even surpasses the strong effect of 6-chlor-$\Delta^{4,6}$-pregnadiene. This increase in effectiveness due to the 4-chlor substituent is highly surprising since it is well known that the 4-chlor progesterone has a substantially weaker effect than progesterone (Chemistry and Industry, Volume 14, page 548 (1963)).

In Table 1 below, three of the compounds of the present invention, identified as I–III are compared with two known gestagenically highly effective compounds IV and V, uper peroral administration in animal tests.

The gestagenic effect was determined in conventional manner by the Clauberg test. The ovulation-impeding effect was tested on female rats. The Table indicates the dosage at which in 50 percent of the animals ovulation was prevented ($WD_{50}$).

The substance I was found as particularly effective in the ovulation-preventing test and is additionally characterized by the fact that, in contrast to the other compounds of Table 1, substance I is even in very large doses free of any antiandrogenic effect.

TABLE I

| Compound | Clauberg-Test Threshold Value (mg) | Ovulation Inhibition $ED_{50}$ (mg) |
|---|---|---|
| I. 4,6-dichlor-16α-methyl-$\Delta^{4,6}$-pregnadiene-17α-ol-3,20-dion-17-acetate | 0.001 | 0.1 – 0.3 |
| II. 4,6-dichlor-1,2α-methylene-$\Delta^{4,6}$-pregnadiene-17α-ol-3,20-dion-17-acetate | 0.001 | 0.3 – 1 |
| III. 4,6-dichlor-$\Delta^{4,6}$-pregnadiene-17α-ol-3,20-dion-17-acetate | 0.003 | 1 – 3 |
| IV. 6-chlor-$\Delta^{4,6}$-pregnadiene-17α-ol-3,20-dion-17-acetate | 0.03 | 1 – 3 |
| V. 17α-ethinyl-$\Delta^{4}$-estrene-17β-ol-3-on | 0.13 | 3 |

The compounds of the present invention are effective in the treatment of the following gunecological disturbances; primary or secondary amenorrhea, endometriosis, hypoplasia uteri, functional bleeding (glandular-cystic hyperplasia), insufficient corpus luteum activity and sterility connected therewith, and menstrual irregularity. Furthermore, the compounds of the present invention may also effectively be used for contraceptive purposes.

The dosage required in an individual case will of course depend on the general condition of the patient and on the severity of the specific condition which is to be treated and, generally, will be between 5 and 100 mg of the effective agent, i.e. the compound of the present invention, per day. It is well within the skill of the art to determine, substantially within the above range, the dosage indicated in a specific case and for a specific condition.

For instance, severe menstrual irregularities may be controlled by cyclical treatment with 10 milligrams per day.

The compounds of the present invention are preferably perorally or intramuscularly administered.

The pharmaceutical compositions of the present invention are produced in conventional manner by combining the effective compounds of the present invention with conventional pharmaceutical carriers or diluents, taste-controlling agents and the like, and converting such mixtures into tablets, dragees, capsules, solutions or any other form in which the pharmaceutical composition is to be administered.

The concentration of the effective agent in such pharmaceutical compositions will depend on the manner in which the composition is to be administered. Thus, each tablet preferably contains between 0.1 and 10 mg of the effective compound, whereas solutions for parenteral administration preferably contain between 1 and 20 mg of the effective compound per ml of solution.

The following Examples are given as illustrative only of the pharmaceutical compositions of the present invention and method of making the same without, however, limiting the invention to specific details of these Examples.

EXAMPLE 1

Gelatin capsules containing 1 mg of effective compound

Each capsule contains 1 mg of 4,6-dichlor-16α-methyl-$\Delta^{4,6}$-pregnadiene-17α-ol-3,20-dion-17-acetate, which compound has been comminuted to a particle size, preferably between 2 and 8 microns and should not contain particles larger than 16 microns; and 208 mg lactose.

These two components are intimately mixed and then filled in conventional manner into capsules of hard gelatin.

EXAMPLE 2

Tablets each containing 5 mg effective compound
Each tablet is composed of:
5,000 mg 4,6-dichlor-16α-methyl-$\Delta^{4,6}$-pregnadiene-17α-ol-3,20-dion-17-acetate, comminuted to a particle size of between 2 and 8 microns with only a small proportion of the particles having a size of up to 16 microns
24.000 mg lactose
45.065 mg cornstarch
4.000 mg talcum
1.400 mg white gelatin
0.500 mg sodium lauryl sulfate
0.024 mg p-oxybenzoic acid methyl ester
0.011 mg p-oxybenzoic acid propyl ester
80.000 mg All of the above consititutents are of pharmaceutically acceptable purity. The lactose, cornstarch, talcum, gelatine and sodium lauryl sulfate serve as filler materials, and the p-oxybenzoic acid methyl ester and the p-oxybenzoic acid propyl ester as preservatives.

The tablets are produced in conventional manner on a tablet-pressing device and will have a diameter of 6 mm, a height of between 2.6 and 2.7 mm, a hardness of about 4 kg (Stokes Test), and are preferably formed with a groove permitting easy breaking of the tablet into two substantially even halves. The tablet disintegrates in water at 20°C in about 30 seconds.

EXAMPLE 3

Aqueous solution for oral administration containing about 1 mg effective compound per ml
100 ml of the solution are formed of:
100 mg 4,6-dichlor-16α-methyl-$\Delta^{4,6}$-pregnadiene-17α-ol-3,20-dion-17-acetate
20 ml ethanol
25 ml propyleneglycol
made up with water to 100 ml.

In this composition, the propyleneglycol serves as solvent.

EXAMPLE 4

Oily solutions for intramuscular injection
Each ampoule to contain 1 ml solution including about 2 mg of the effective compound.
200 mg 4,6-dichlor-16α-methyl-$\Delta^{4,6}$-pregnadiene-17α-ol-3,20-dion-17-acetate are dissolved in a mixture of 50 parts sesame oil and 1 part benzyl alcohol to form 100 ml of solution which is then filled into ampoules each holding 1 ml and sterilized in conventional manner.

The following Examples will serve to illustrate the method of producing the compounds of the present invention and again the invention is not to be considered limited to the specific details of the Examples.

EXAMPLE 5

5.0 g of 6-chlor-1,2α-methylene-$\Delta^{4,6}$-pregnadiene-17α-ol-3,20-dion-17-acetate in 245 ml acetic acid is reacted with 24.5 g lithium chloride and 5.0 g N-chlorsuccinimide and, after the addition of 10 ml of hydrogen chloride gas-saturated dioxan, the reaction mixture is stirred for one hour at room temperature. The mixture is then stirred into ice water, the thereby-formed precipitate is sucked off and dissolved in methylene chloride.

The methylene chloride phase is then washed with sodium hydrogen carbonate solution and water, dried over sodium sulfate and completely dried under vacuum. The thus-obtained residue is dissolved in 30 ml pyridine and allowed to stand at room temperature for 16 hours.

After diluting the solution with ether and washing with diluted hydrochloric acid and water, the solution is dried over sodium sulfate and vaporized to dryness under vacuum. The thus-obtained residue is subjected to chromatography on silica gel in conventional manner and, after recrystallization from isopropyl ether, 1.6 g of 4,6-dichlor-1,2α-methylene-$\Delta^{4,6}$-pregnadiene-17α-ol-3,20-dion-17-acetate is obtained, having a melting point of 256°–257°C.

UV: $\epsilon_{218} = 5.700$; $\epsilon_{296} = 14.100$

EXAMPLE 6

1.16 g 4-chlor-1,2α-methylene-$\Delta^{4,6}$-pregnadiene-17α-ol-3,20-dion-17-acetate is reacted and worked up as described in Example 5. After chromatography on silica gel and recrystallization form isopropyl ether, 730 mg of 4,6β,7α-trichlor-1,2α-methylene-$\Delta^4$pregnene-17α-ol-3,20-dion-17-acetate is obtained having a melting point of 228°–229°C.

UV: $\epsilon_{253} = 9.620$

Four hundred and sixty mg of the thus-obtained trichlor compound is heated in 18.5 ml tetrahydrofuran with 4.6 ml of 1,5-diazabicyclo-(4,3,0)-5-nonen under reflux for 5½ hours. After dilution with ether, the solution is washed with diluted hydrochloric acid and water, dried over sodium sulfate and evaporated to dryness under vacuum. After purification by layer-chromatography in per se conventional manner, and recrystallization from isopropyl ether, 45 mg of 4,6-dichlor-1,2α-methylene-$\Delta^{4,6}$-pregnadiene-17α-ol-3,20-dion-17 -acetate is obtained having a melting point of 255°–257°C.

UV: $\epsilon_{218} = 6.000$; $\epsilon_{296} = 14.000$

EXAMPLE 7

3.0 g 6-chlor-1,2α;16,17α-bismethylene-$\Delta^{4,6}$-pregnadiene-3,20-dion in 150 ml acetic acid is reacted with 15 g lithium chloride and 3.0 g N-chloracetamide. After the addition of 6 ml hydrogen chloride gas-saturated dioxan, the reaction mixture is stirred for one hour at room temperature.

Thereafter, the mixture is worked up as described in Example 1. After chromatography on silica gel and recrystallization for ethyl acetate, 1.62 g of 4,6-dichlor-1,2α;16,17α-bismethylene-$\Delta^{4,6}$-pregnadiene-3,20-dion is obtained having a melting point of 266.5°–269°C.

UV: $\epsilon_{297} = 14.000$

EXAMPLE 8

Eight hundred mg 6-chlor-1,2α-methylene-16α-methyl-$\Delta^{4,6}$-pregnadiene-17α-ol-3,20-dion-17-acetate is reacted and worked up as described in Example 5. After chromatography on silica gel and recrystallization from isopropyl ether, 420 mg of 4,6-dichlor-1,2α-methylene-16α-methyl-$\Delta^{4,6}$-pregnadiene-17α-ol-3,20-dion-17-acetate is obtained having a melting point of 245°–247°C.

UV: $\epsilon_{219} = 5.650$; $\epsilon_{296} = 13.200$

EXAMPLE 9

1.98 g 21-fluor-6-chlor-1,2α-methylene-$\Delta^{4,6}$-pregnadiene-17α-ol-3,20-dion-17-acetate is reacted and worked up as described in Example 5. After chromatography on silica gel and recrystallization from isopropyl ether, 470 mg of 21-fluor-4,6-dichlor-1,2α-methylene-$\Delta^{4,6}$-pregnadiene-17α-ol-3,20-dion-17-acetate is obtained having a melting point of 267.5°–268.5°C.

UV: $\epsilon_{218} = 5.840$; $\epsilon_{295} = 14.100$

EXAMPLE 10

5.0 g 6-chlor-$\Delta^{4,6}$-pregnadiene-17α-ol-3,20-dion-17-acetate is reacted and worked up as described in Example 5. After chromatography on silica gel and recrystallization from isopropyl ether, 1.7 g of 4,6-dichlor-$\Delta^{4,6}$-pregnadiene-17α-ol-3,20-dion-17-acetate is obtained having a melting point of 234°–235°C.

UV: $\epsilon_{299} = 16.800$.

EXAMPLE 11

5.0 g 6-chlor-16α-methyl-$\Delta^{4,6}$-pregnadiene-17α-ol-3,20-dion-17-acetate is reacted and worked up as described in Example 5. After chromatography on silica gel and recrystallization from isopropyl ether, 1.66 g of 4,6-dichlor-16α-methyl-$\Delta^{4,6}$-pregnadiene-17α-ol-3,20-dion-17-acetate is obtained having a melting point of 176°–176.5°C.

UV: $\epsilon_{299} = 17.300$

EXAMPLE 12

Three g of 6-chlor-1,2α-methylene-$\Delta^{4,6}$-androstadiene-17α-ol-3-on-17-enanthate is reacted and worked up as described in Example 5. After chromatography on silica gel, 1.4 g of 4,6-dichlor-1,2α-methylene-$\Delta^{4,6}$-androstadiene-17β-ol-3-on-17-enanthate is obtained in the form of an oil.

UV: $\epsilon_{218} = 5.400$; $\epsilon_{297} = 14.200$

EXAMPLE 13

450 mg 6-chlor-17α,20;20,21-bismethylendioxy-$\Delta^{4,6}$-pregnadiene-3,11-dion is reacted and worked up as described in Example 5. After chromatography on silica gel and recrystallization from isopropyl ether/methylene chloride, 240 mg of 4,6-dichlor-17α,20;20,21-bismethylendioxy-$\Delta^{4,6}$-pregnadiene-3,11-dion is obtained having a melting point of 231.5°–233.5°C.

UV: $\epsilon_{295} = 16.700$

EXAMPLE 14

Five hundred mg 4,6-dichlor-$\Delta^{4,6}$-pregnadiene-17α-ol-3,20-dion-17-acetate (produced as described in Example 10) is heated under reflux in 25 ml of absolute tertiary butanol with 150 mg selenium dioxide and 0.25 ml acetic acid for 24 hours under stirring and in a stream of nitrogen. Thereafter, another 150 mg selenium dioxide is added and heating is continued in the same manner for an additional 24 hours. After separation of the precipitated selenium, the filtrate is evaporated to dryness under vacuum. The residue is diluted with ethyl acetate, washed with sodium hydrogen carbonate solution and water, dried over sodium sulfate and evaporated to dryness under vacuum. After purification by thin-layer chromatography and recrystallization from isopropyl ether, 40 mg of 4,6-dichlor-$\Delta^{1,4,6}$-pregnatriene-17α-ol-3,20-dion-17-acetate is obtained having a melting point of 222°–222.5°C.

UV: $\epsilon_{232} = 11.600$; $\epsilon_{258} = 7.700$; $\epsilon_{304} = 9.200$

EXAMPLE 15

2.0 g 6-chlor-1,2α-methylene-$\Delta^{4,6}$-androstadiene-17β-ol-3-on-17-acetate is reacted and worked up as described in Example 5. After, chromatography on silica gel and recrystallization from acetone/hexane, 730 mg of 4,6-dichlor-1,2α-methylene-$\Delta^{4,6}$-androstadiene-17β-ol-3-on-17-acetate is obtained having a melting point of 191°–192.5°C.

UV: $\epsilon_{218} = 5.630$; $\epsilon_{296} = 13.800$.

EXAMPLE 16

3.0 g 6-chlor-$\Delta^{4,6}$-androstadiene-17β-ol-3-on-17-acetate is reacted and worked up as described in Example 5. After chromatography on silica gel and recrystallization from isopropyl ether, 1.1 g. of 4,6-dichlor-$\Delta^{4,6}$-androstadiene-17β-ol-3-on-17-acetate is obtained having a melting point of 148.5°–149.5°C.

UV: $\epsilon_{299} = 16.500$

EXAMPLE 17

Three hundred mg 4,6-dichlor-$\Delta^{4,6}$-androstadiene-17β-ol-3-on-17-acetate (produced as described in Example 16) is reacted and worked up as described in Example 14. After purification by thin-layer chromatography and recrystallization from isopropyl ether, 65 mg of 4,6-dichlor-$\Delta^{1,4,6}$-androstatriene 17β-ol-3-on-17-acetate is obtained having a melting point of 167°–168°C.

UV: $\epsilon_{233} = 11.200$; $\epsilon_{259} = 7.290$; $\epsilon_{307} = 8.440$.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. 4,6-dichlor-1,2α;16;17α-bismethylene-$\Delta^{4,6}$-pregnadiene-3,20-dion.

* * * * *